(12) United States Patent
Aubert

(10) Patent No.: US 10,949,331 B1
(45) Date of Patent: Mar. 16, 2021

(54) INTEGRATION TESTING OF WEB APPLICATIONS UTILIZING DYNAMICALLY GENERATED AUTOMATION IDENTIFIERS

(71) Applicant: EMC IP Holding Company LLC, Hopkinton, MA (US)

(72) Inventor: Raphaël Aubert, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/776,911

(22) Filed: Jan. 30, 2020

(51) Int. Cl.
G06F 9/44 (2018.01)
G06F 11/36 (2006.01)
G06F 16/958 (2019.01)
G06F 11/34 (2006.01)

(52) U.S. Cl.
CPC ...... *G06F 11/3644* (2013.01); *G06F 11/3476* (2013.01); *G06F 11/3664* (2013.01); *G06F 16/958* (2019.01)

(58) Field of Classification Search
None
See application file for complete search history.

(56) References Cited

U.S. PATENT DOCUMENTS

| | | | |
|---|---|---|---|
| 2003/0154239 A1 | 8/2003 | Davis et al. | |
| 2007/0147306 A1 | 6/2007 | Halpern | |
| 2011/0145360 A1* | 6/2011 | Sheshagiri | G06F 9/5027 717/110 |
| 2012/0166963 A1* | 6/2012 | Kohli | G06F 8/74 715/744 |
| 2016/0285958 A1 | 9/2016 | Das et al. | |
| 2017/0200098 A1* | 7/2017 | Lau | G06Q 10/0633 |
| 2018/0219810 A1* | 8/2018 | Santos Ramirez | H04L 51/14 |

OTHER PUBLICATIONS

Michael Geers, "Micro Frontends—Extending the Microservice Idea to Frontend Development," https://micro-frontends.org/, downloaded Sep. 30, 2019, 6 pages.
U.S. Appl. No. 16/673,052 filed in the name of Raphaël Aubert, filed Nov. 4, 2019, and entitled "Using Web Application Components with Different Web Application Frameworks in a Web Application."
U.S. Appl. No. 16/588,168 filed in the name of Raphaël Aubert, filed Sep. 30, 2019, and entitled "Migration of Web Applications between Different Web Application Frameworks."

* cited by examiner

*Primary Examiner* — Qamrun Nahar
(74) *Attorney, Agent, or Firm* — Ryan, Mason & Lewis, LLP

(57) ABSTRACT

An apparatus comprises a processing device configured to select a subset of a plurality of web components of a web application, the web components being arranged in a web component hierarchy, each web component comprising one or more web elements. The processing device is also configured to assign a tag to each web component in the subset. The processing device is further configured to dynamically generate an automation identifier for a given instance of at least one of the web elements, the generated automation identifier being based at least in part on parameters of the tags assigned to web components in a path from a root of the web component hierarchy to the at least one web element. The processing device is further configured to perform integration testing of the web application utilizing the dynamically generated automation identifier for the given instance of the at least one web element.

20 Claims, 7 Drawing Sheets

INTEGRATION TESTING OF WEB APPLICATIONS UTILIZING DYNAMICALLY GENERATED AUTOMATION IDENTIFIERS

FIELD

The field relates generally to information processing, and more particularly to techniques for managing web applications.

BACKGROUND

Web applications, also referred to as web apps, are application programs designed for delivery to users over a network, such as the Internet, through a browser interface. For example, web applications include client-server computer programs in which the client runs in a web browser and the web application is hosted in the server. Web applications may include web services and other website components that perform functions for users. Various software frameworks may be used to provide web applications. Such software frameworks, also referred to as web frameworks or web application frameworks, facilitate the building and deployment of web applications. For example, web application frameworks can provide common libraries for various application functions and promote code re-use.

SUMMARY

Illustrative embodiments of the present disclosure provide techniques for integration testing of web applications utilizing dynamically generated automation identifiers.

In one embodiment, an apparatus comprises at least one processing device comprising a processor coupled to a memory. The at least one processing device is configured to perform the step of selecting at least a subset of a plurality of web components of a web application, the plurality of web components of the web application being arranged in a web component hierarchy, each of the plurality of web components comprising one or more web elements of the web application. The at least one processing device is further configured to perform the step of assigning a tag to each web component in the subset of the plurality of web components, the tags comprising parameters identifying respective ones of the web components in the subset of the plurality of web components. The at least one processing device is further configured to perform the step of dynamically generating an automation identifier for a given instance of at least one of the one or more web elements of the web application, the generated automation identifier being based at least in part on the parameters of the tags assigned to web components in the subset of the plurality of web components that are in a path from a root of the web component hierarchy to the at least one web element. The at least one processing device is further configured to perform the step of performing integration testing of the web application utilizing the dynamically generated automation identifier for the given instance of the at least one web element.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
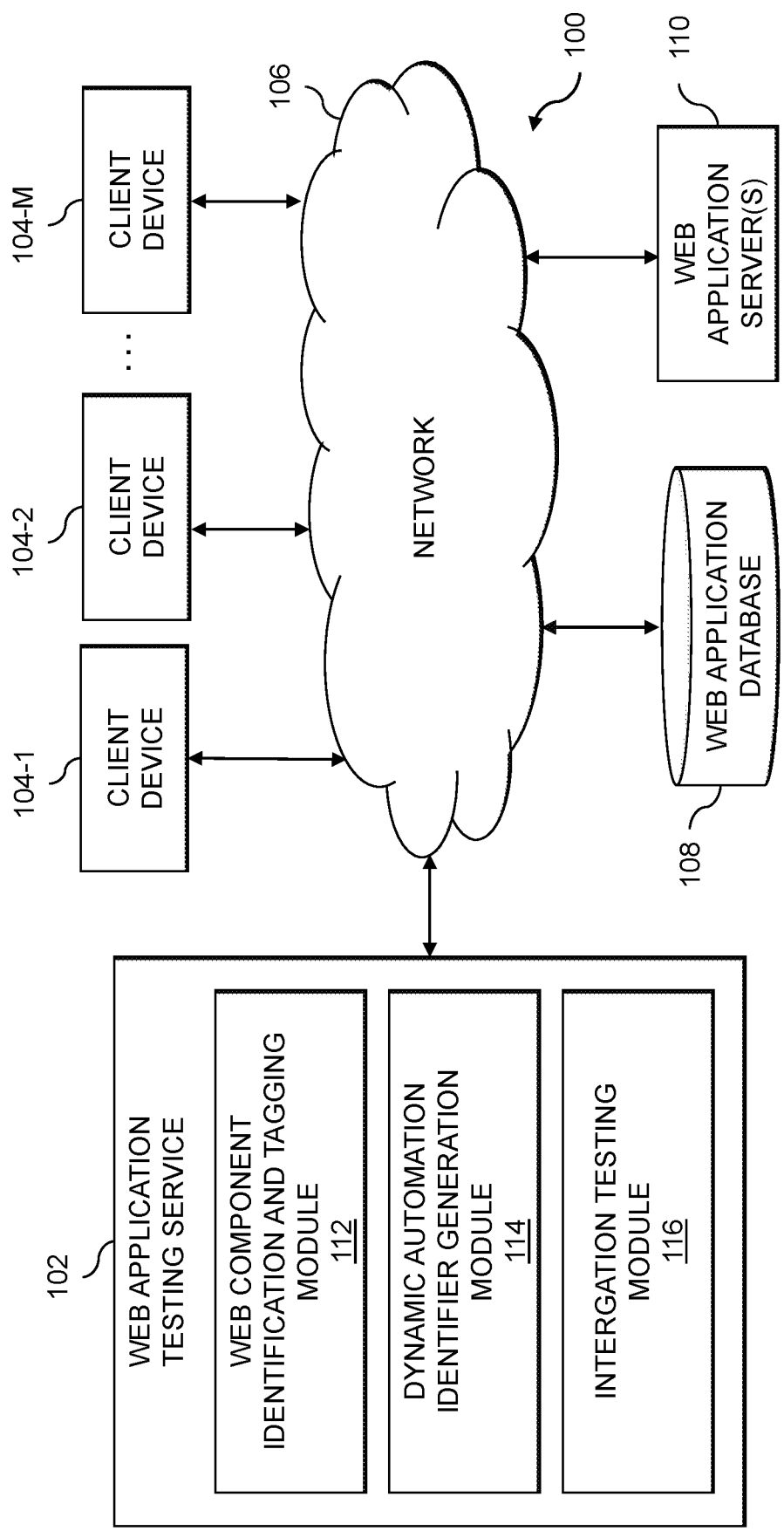
FIG. 1 is a block diagram of an information processing system for integration testing of web applications utilizing dynamically generated automation identifiers in an illustrative embodiment.

FIG. 1 shows an information processing system 100 configured in accordance with an illustrative embodiment. The information processing system 100 is assumed to be built on at least one processing platform and provides functionality for integration testing of web applications utilizing dynamically generated automation identifiers. The information processing system 100 includes a web application testing service 102, which is coupled via a network 106 to a set of web application servers 110. The web application servers 110 are assumed to be accessed, over network 106, by client devices 104-1, 104-2, . . . 104-M (collectively, client devices 104), such as via web browsers running on the client devices. Also coupled to the network 106 is a web application database 108, which may store various information relating to the web applications hosted by the web application servers 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The web application database 108, as discussed above, is configured to store and record information relating to web applications hosted by the web application servers 110. Such information may include, but is not limited to, component hierarchies for the web applications, string identifiers for components of the web applications, etc.

The web application database 108 in some embodiments is implemented using one or more storage systems or devices associated with the web application testing service 102 or web application servers 110. In some embodiments, one or more of the storage systems utilized to implement the web application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the web application testing service 102, the client devices 104, the web application database 108, and the web application servers 110, as well as to support communication between the web application testing service 102, client devices 104, web application database 108, web application servers 110 and other related systems and devices not explicitly shown.

In some embodiments, the client devices 104 and/or web application servers 110 may implement host agents that are configured for communication with the web application testing service 102. The host agents may be configured to invoke the web application testing service 102 when a particular web application (e.g., that is hosted by one of the web application servers 110 and which is run partially in a web browser on one of the client devices 104) is to be tested (e.g., end-to-end integration testing). Once invoked, the web application testing service 102 can perform integration testing of the web application as described in further detail below, and send notifications or alerts to the host agents with results of the integration testing.

It should be noted that a "host agent" as this term is generally used herein may comprise an automated entity, such as a software entity running on a processing device. Accordingly, a host agent need not be a human entity.

Although shown as separate from the client devices 104 and web application servers 110 in the FIG. 1 embodiment, it should be appreciated that the web application testing service 102 may be implemented at least in part within one or more of the client devices 104 or web application servers 110 in some embodiments.

The web application testing service 102 in the FIG. 1 embodiment is assumed to be implemented using at least one processing device. Each such processing device generally comprises at least one processor and an associated memory, and implements one or more functional modules for controlling certain features of the web application testing service 102. In the FIG. 1 embodiment, the web application testing service 102 implements a web component identification and tagging module 112, a dynamic automation identifier generation module 114, and an integration testing module 116.

The web component identification and tagging module 112 is configured to select at least a subset of a plurality of web components of a web application that is to be tested. The plurality of web components are arranged in a web component hierarchy (e.g., a tree-like hierarchy), and each of the web components comprises one or more web elements of the web application. The subset of the plurality of web components may be "key" web components that have meaning in terms of defining sections of the web application. The web component identification and tagging module 112 is also configured to assign a tag to each web component in the subset of the plurality of web components. The tags comprise parameters identifying respective ones of the web components in the subset of the plurality of web components. The parameters may comprise strings of names of the web components (e.g., webcomponent1, webcomponent2, etc.). The tags may be implemented as configuration-based code constructs of the web components (e.g., annotations, which are referred to as decorators in some scripting languages such as JavaScript and TypeScript).

The dynamic automation identifier generation module 114 is configured to dynamically generate an automation identifier for a given instance of at least one of the one or more web elements of the web application. The generated automation identifier is based at least in part on the parameters of the tags assigned to web components in the subset of the plurality of web components that are in a path from a root of the web component hierarchy to the at least one web element. To do so, the dynamic automation identifier generation module 114 may apply at least one directive code construct to the at least one web element, where the at least one directive code construct is configured to bind a lifecycle of the given instance of the at least one web element to an automation identifier attribute comprising the dynamically generated automation identifier. The at least one directive is configured to attach the automation identifier attribute to the at least one web element responsive to mounting the given instance of the at least one web element in a document object model (DOM) of the web application.

The dynamically generated automation identifier may comprise a fully qualified name of the given instance of the at least one web element. The fully qualified name of the given instance of the at least one web element comprises a concatenation of the parameters of the tags assigned to web components in the subset of the plurality of web components that are in the path from the root of the web component hierarchy to the at least one web element. For example, where the parameters comprise strings that are names of the web components (e.g., parentwebcomponent1, parentwebcomponent2, childwebcomponent1, childwebcomponent2, etc.), the fully qualified name for a given instance of a given web element may comprise a string such as: /rootwebcomponent/parentwebcomponent1/childwebcomponent1/givenwebelement.

The integration testing module 116 is configured to performing integration testing (e.g., end-to-end integration testing) of the web application utilizing the dynamically generated automation identifier for the given instance of the at least one web element.

It is to be appreciated that the particular arrangement of the web application testing service 102, the web component identification and tagging module 112, the dynamic automation identifier generation module 114, and the integration testing module 116 illustrated in the FIG. 1 embodiment is presented by way of example only, and alternative arrangements can be used in other embodiments. As discussed above, for example, the web application testing service 102, or portions thereof such as one or more of the web component identification and tagging module 112, the dynamic automation identifier generation module 114, and the integration testing module 116, may in some embodiments be implemented internal to one or more of the client devices 104 or web application servers 110. As another example, the functionality associated with the web component identification and tagging module 112, the dynamic automation identifier generation module 114, and the integration testing module 116 may be combined into one module, or separated across more than three modules with the multiple modules possibly being implemented with multiple distinct processors or processing devices.

At least portions of the web component identification and tagging module 112, the dynamic automation identifier generation module 114, and the integration testing module 116 may be implemented at least in part in the form of software that is stored in memory and executed by a processor.

It is to be understood that the particular set of elements shown in FIG. 1 for integration testing of web applications utilizing dynamically generated automation identifiers is presented by way of illustrative example only, and in other embodiments additional or alternative elements may be used. Thus, another embodiment may include additional or alternative systems, devices and other network entities, as well as different arrangements of modules and other components.

The web application testing service 102 and other portions of the system 100 may be part of cloud infrastructure as will be described in further detail below. The cloud infrastructure hosting the web application testing service 102 may also host one or more of the web application servers 110 and/or client devices 104.

The web application testing service 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The web application testing service 102, client devices 104, web application database 108 and web application servers 110 or components thereof may be implemented on respective distinct processing platforms, although numerous other arrangements are possible. For example, in some embodiments at least portions of the web application testing service 102 and one or more of the client devices 104 or web application servers 110 are implemented on the same processing platform. A given one of the web application servers 110 or client devices 104 can therefore be implemented at least in part within at least one processing platform that implements at least a portion of the web application testing service 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the web application testing service 102, client devices 104, web application database 108 and web application servers 110, or portions or components thereof, to reside in different data centers. Numerous other distributed implementations are possible. The web application component restriction check service 102 or portions thereof can also be implemented in a distributed manner across multiple data centers.

Additional examples of processing platforms utilized to implement the web application testing service 102 and other portions of the system 100 in illustrative embodiments will be described in more detail below in conjunction with FIGS. 6 and 7.

It is to be appreciated that these and other features of illustrative embodiments are presented by way of example only, and should not be construed as limiting in any way.

Figure 2:
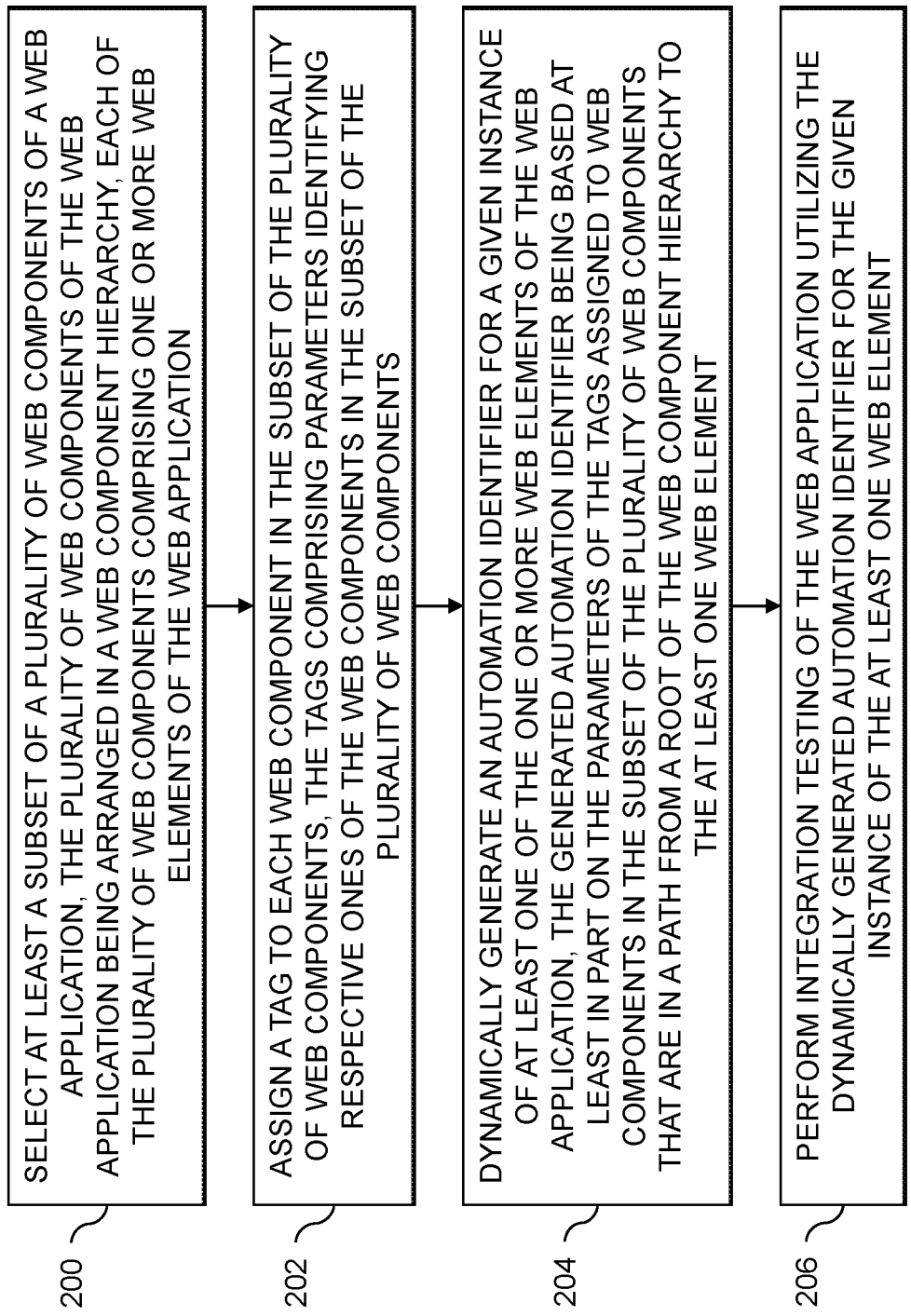
FIG. 2 is a flow diagram of an exemplary process for integration testing of web applications utilizing dynamically generated automation identifiers in an illustrative embodiment.

An exemplary process for integration testing of web applications utilizing dynamically generated automation identifiers will now be described in more detail with reference to the flow diagram of FIG. 2. It is to be understood that this particular process is only an example, and that additional or alternative processes for integration testing of web applications utilizing dynamically generated automation identifiers may be used in other embodiments.

In this embodiment, the process includes steps 200 through 206. These steps are assumed to be performed by the web application testing service 102 utilizing the web component identification and tagging module 112, the dynamic automation identifier generation module 114, and the integration testing module 116. The process begins with step 200, selecting at least a subset of a plurality of web components of a web application. The plurality of web components of the web application are arranged in a web component hierarchy, and each of the plurality of web components comprises one or more web elements of the web application. Step 200 may include selecting ones of the plurality of web components that identify different sections of a given page of the web application that is to be integration tested.

In step 202, a tag is assigned to each web component in the subset of the plurality of web components. The tags comprise parameters identifying respective ones of the web components in the subset of the plurality of web components. In some embodiments, the tags comprise annotation code constructs. For components of the web application that utilize a script programming language (e.g., JavaScript, TypeScript, etc.), the annotation code constructs may comprise decorators. The tags may include configuration flags configured to be set to a first value to enable generation of automation identifiers and to a second value to disable generation of automation identifiers. For example, a given web component may be associated with a given section of a given page of the web application. A given tag assigned to the given web component may have its configuration flag set to the first or second value to enable or disable generation of automation identifiers for the given section of the given page of the web application.

An automation identifier is dynamically generated for a given instance of at least one of the one or more web elements of the web application in step 204. The generated automation identifier is based at least in part on the parameters of the tags assigned to web components in the subset of the plurality of web components that are in a path from a root of the web component hierarchy to the at least one web element. Step 204 may include applying at least one directive code construct to the at least one web element, the at least one directive code construct being configured to bind a lifecycle of the given instance of the at least one web element to an automation identifier attribute comprising the dynamically generated automation identifier. In some embodiments, the at least one directive is configured to attach the automation identifier attribute to the given instance of the at least one web element responsive to mounting the given instance of the at least one web element in a DOM of the web application. In other embodiments, the at least one directive is configured to attach the automation identifier attribute to the at least one web element responsive to (i) detection of one or more triggers and (ii) mounting the given instance of the at least one web element in a document object model of the web application. The one or more triggers may comprise determining that the web application is running on a web application server dedicated for integration testing, determining that the web application is running in a test phase, etc.

The dynamically generated automation identifier may comprise a fully qualified name of the given instance of the at least one web element. The fully qualified name of the given instance of the at least one web element may comprise a concatenation of the parameters of the tags assigned to web components in the subset of the plurality of web components that are in the path from the root of the web component hierarchy to the at least one web element. In some embodiments, step 204 is re-executed to update the dynamically generated automation identifier of the given instance of the at least one web element responsive to the at least one web element changing a location within a given page of the web application.

In step 206, integration testing of the web application is performed utilizing the dynamically generated automation identifier for the given instance of the at least one web element. Step 206 may include utilizing a user interface element to toggle highlighting of web elements of a given page of the web application under test that comprise dynamically generated automation identifiers (e.g., for easier consumption while writing an integration test for the given page of the web application).

Figure 3:
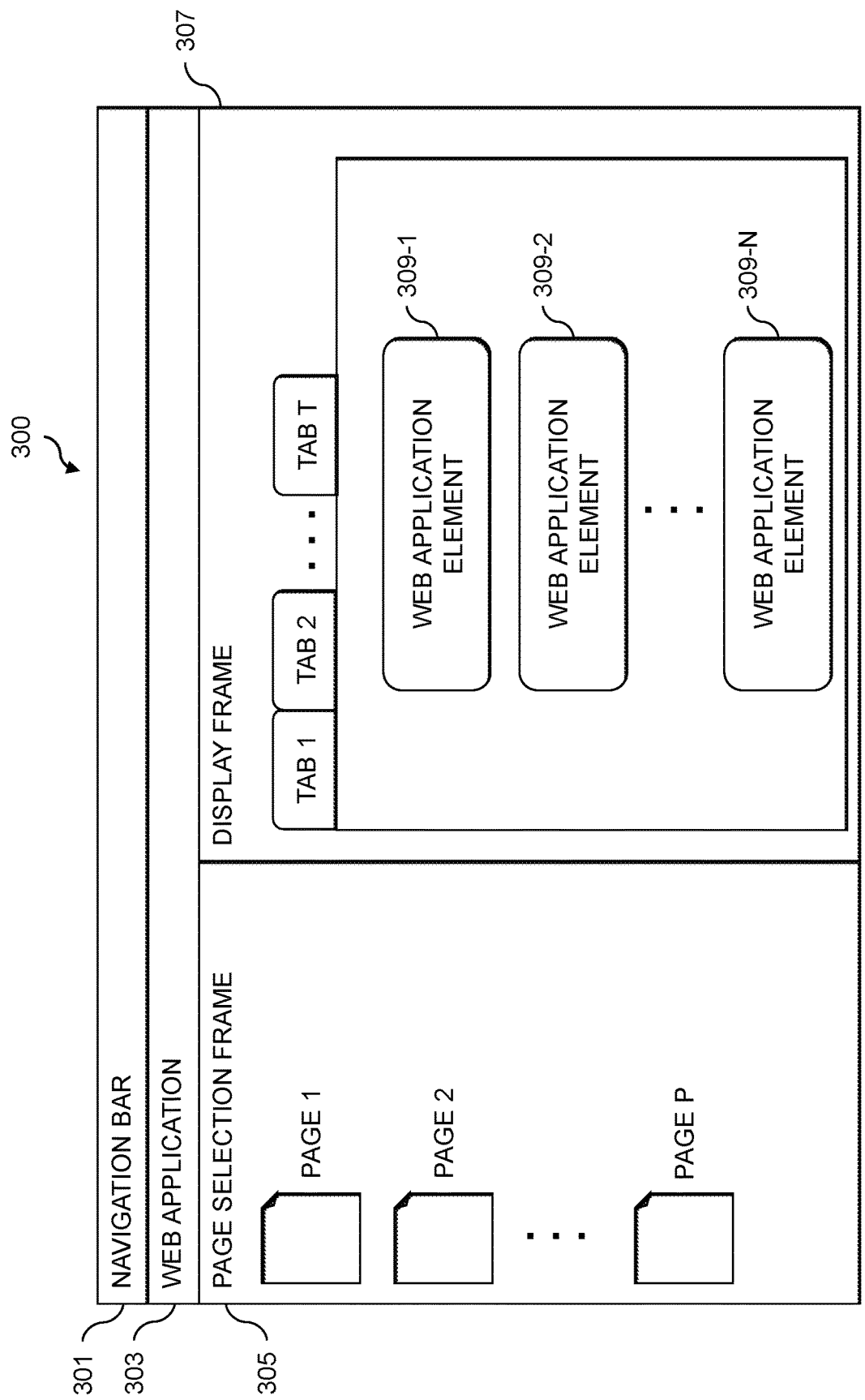
FIG. 3 illustrates a view of different portions of a web application in an illustrative embodiment.

FIG. 3 shows an example layout 300 of a web application 303. The layout 300 includes a navigation bar 301, which may be a portion of a web browser that is utilized to type in or otherwise input uniform resource locators (URLs) to load the web application 303. The web application 303 also includes a page selection frame 305, allowing a user to select from pages 1, 2, . . . P to present in the display frame 307. The display frame 307 as shown includes a set of tabs 1, 2, . . . T. When a particular page and tab are selected (e.g., page 1, tab 1) that page or tab gets loaded into the display frame 307, along with a set of web application elements 309-1, 309-2, . . . 309-N (collectively, elements 309). The web application elements 309 may comprise charts, plots, tables, visualizations, widgets, or other elements of the web application 303.

Various web application frameworks may utilize a component-based architecture. Some web application frameworks further have a modular architecture, where modules are utilized to organize the web application into functional blocks wrapping components thereof (as well as other parts or portions of the web application, such as directives and services). In the modular architecture, the web application includes a root module and possibly one or more additional modules. Each of the additional modules may be utilized for a particular type of functionality or feature of the web application.

The components of a web application may be viewed as basic building blocks for a user interface (UI) of the web application. Each component may control one or more portions of the display, also referred to as views, provided by the web application. Components are self-contained, and provide reusable pieces of the UI of the web application. More generally, each component encapsulates some functionality of the web application. A given component may include a template defining a visual structure (e.g., using one or more hypertext markup language (HTML) files), logic defining its behavior (e.g., using JavaScript code, TypeScript code, etc.), and a style that defines the style of the component (e.g., using one or more cascading style sheet (CSS) files). Components pass data to associated views using data binding processes (e.g., by binding DOM elements to component properties). Components of the web application may utilize services (e.g., values, functions, features), where the services provide classes with a specific purpose (e.g., fetching data, logging, etc.). Services may be used to share resources across components of the web application.

Figure 4:
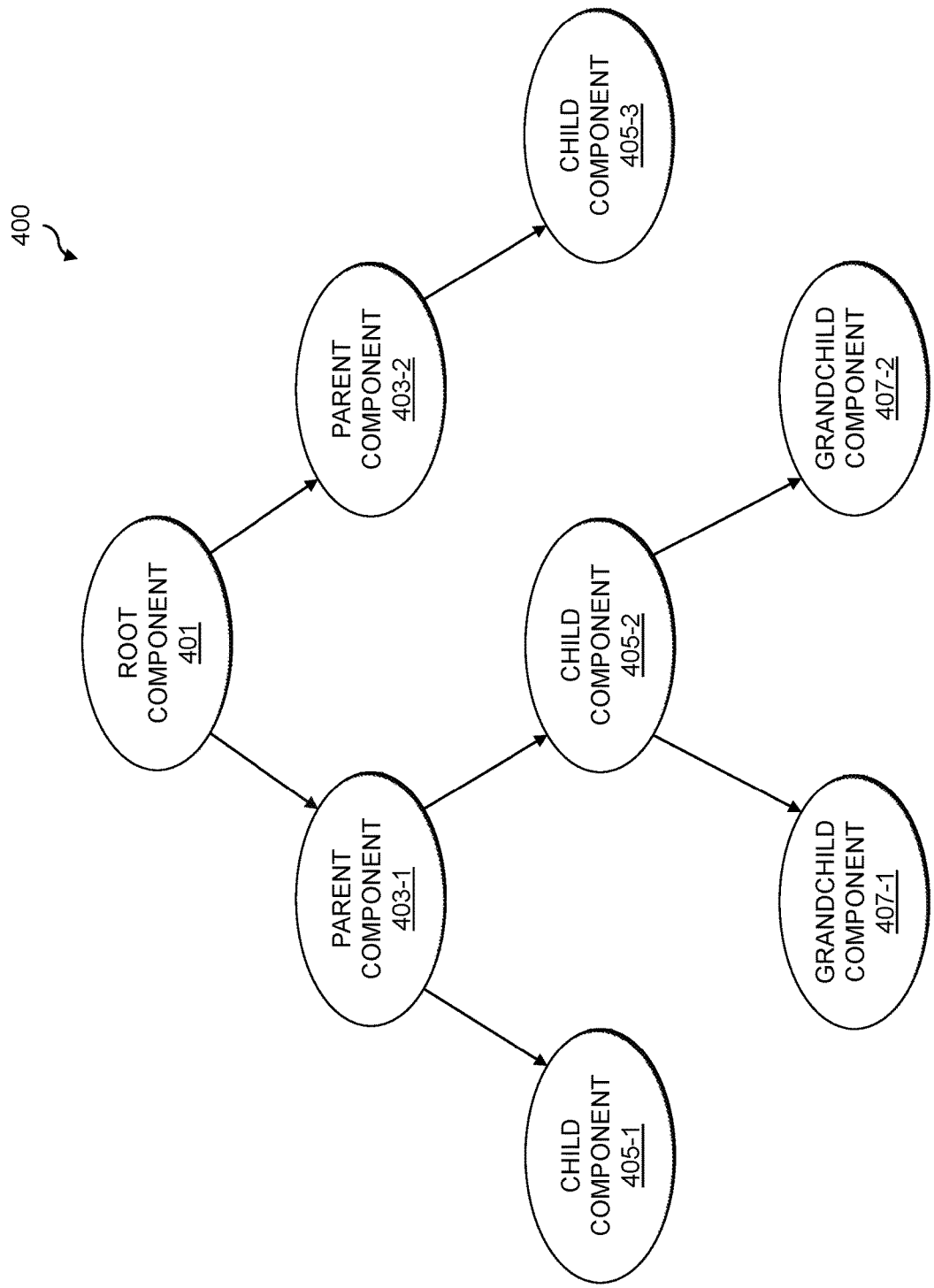
FIG. 4 shows a component hierarchy for a web application in an illustrative embodiment.

A web application may be viewed as a tree-like hierarchy of its components. FIG. 4 shows an example of a tree-like hierarchy 400 of components of a web application. In the hierarchy 400, there is a root component 401, and two parent components 403-1 and 403-2. The parent component 403-1 has two child components 405-1 and 405-2, and the parent component 403-2 has a child component 405-3. The child component 405-2 has two grandchild components 407-1 and 407-2. The root component 401 may also be referred to as an application component. To consider a specific example, the parent component 403-1 may provide a menu UI element, while the parent component 403-2 provides a shopping cart UI element. The child components 405-1 and 405-2 may provide different menu item UI elements in the menu UI element of parent component 403-1. The grandchild components 407-1 and 407-2 may provide sub-items in the menu UI element of child component 405-1. The child component 405-3 may provide a button UI element (e.g., a "checkout" button) for the shopping cart UI element of parent component 403-2. It should be appreciated that the above example hierarchy of UI elements for a web application is present by way of example only.

As a web application becomes complex, it is important to setup end-to-end integration testing. Such end-to-end integration testing may in some cases be mandatory. For example, a software development and information-technology operations (DevOps) environment may have a continuous flow of updates requiring continuous testing to allow proper detection of issues and regressions. For integration testing, it is necessary to identify elements in a page of a web application that are relevant to the integration testing system (e.g., elements that the integration testing system interacts with, elements that the integration testing system checks, etc.). To identify such elements, one approach is to assign a specific attribute and value to the elements. This, however, is a manual and labor-intensive process. As more developers and teams work on a particular web application, as the number of components of the web application grows, and as more projects glue into a single web application, the less consistent, robust and maintainable this manual approach becomes.

Illustrative embodiments provide techniques for configuration automation identifiers in a simple and consistent way throughout a web application. Shared components that are re-used through the web application can pre-configure them, but the resulting automation identifiers will vary based on the component location and containers.

In web applications based on various modern web application frameworks (e.g., Angular, React, Vue, etc.), developers create components to encompass different containers and views, and then composes those components to create the web application content and pages. The components of the web application form a tree-like hierarchy as discussed above. Some embodiments rely on this tree-like hierarchy to generate automation identifiers automatically. To do so, some embodiments select "key" components in the tree-like hierarchy, where the key components refer to components that have a meaning in terms of web application sections. The key components are tagged with "simple" identifiers and optional configuration data. The term "simple" in this context distinguishes these identifiers from the fully qualified automation identifier for a particular element of the web application, where the fully qualified automation identifier may be built using the simple identifiers for components in the hierarchy that are ancestors of that element. At the lowest level (e.g., at the "leaf" level of the tree-like hierarchy), the elements of interest are pinpointed for the integration testing system with configuration only. Some post-processing (e.g., in the form of directives) is attached to these elements, along with the simple identifiers. The directives on these elements build the fully qualified automation identifiers and register them on HTML elements in order to enable application-wide configurable behaviors at a single location (e.g., the directive).

Figure 5:
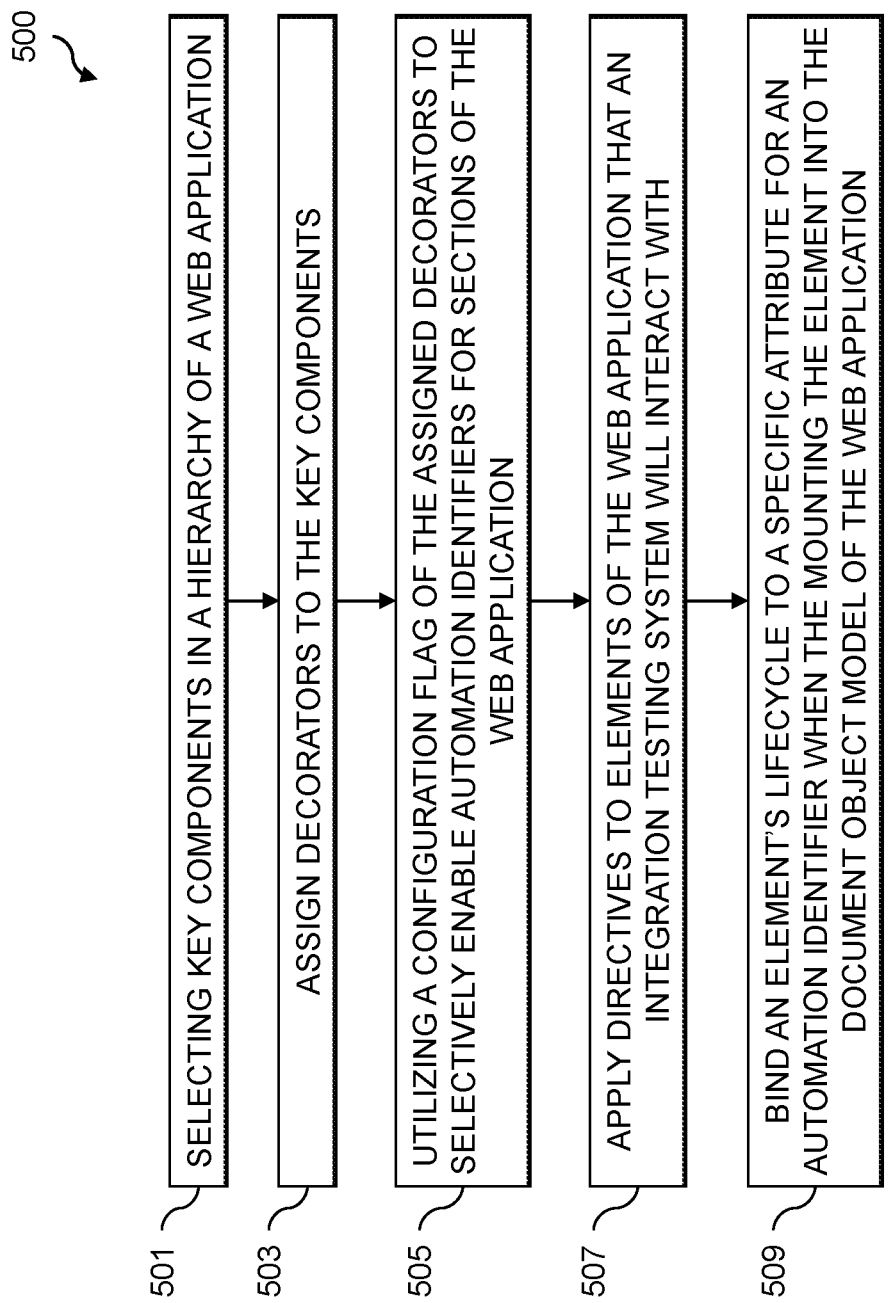
FIG. 5 shows a system flow for dynamic generation of automation identifiers in an illustrative embodiment.

An implementation for dynamic generation of automation identifiers will now be described with respect to the use of configuration-based tagging code constructs and the system flow 500 of FIG. 5. The configuration-based tagging code constructs include decorators or other annotations (e.g., assigned to components of the web application to enable or disable automation identifiers on sections of the web application) and directives (e.g., applied to elements of the web application that the integration testing system interacts with).

Decorators are assigned to components of a web application for easy and reliable configuration-based tagging. More specifically, decorators are assigned to components of the web application that play a key role in identifying sections. In step 501, the key components of the web application are selected, and in step 503 the decorators are assigned to the key components. Containers are assigned a custom decorator that takes a string (e.g., the simple identifier) as a parameter. The decorator stores this information as metadata on the object itself, but does not attach any additional attribute anywhere. The decorators assigned to the components are used to enable or disable automation identifiers on whole sections of the web application with a single configuration flag. The configuration flag is an optional configuration setting that is sent along with the simple identifier in the decorators. In step 505, the configuration flag of the assigned decorators is used to selectively enable automation identifiers for sections of the web application.

A custom directive is applied to elements of the web application that the integration testing system will interact with in step 507. Such elements include, but are not limited to, buttons, drop-downs, tabs, dynamic content to be checked, etc. A given directive, when attached to a given instance of a given element (e.g., an HTML element) of the web application, binds to the given element's lifecycle to attach a specific attribute (e.g., an automation identifier or automation-id) to the given instance of the given element when the given instance of the given element gets mounted into the DOM of the web application in step 509. The given directive will compute the attribute value based on the component hierarchy of the web application by navigating the component hierarchy to find those ancestors that have been tagged as key components (e.g., using decorators as previously described) and grabs the simple identifiers associated with the key components. The directive then builds a fully qualified automation identifier and attaches the fully qualified automation identifier to the given element. In this way, some embodiments enable automatic generation of the automation identifiers based on a path through the component hierarchy of the web application. Thus, if the given element moves to a different location in a page of the web application, the process may be re-run to update the automation identifiers.

In a development mode, a utility can be used to toggle highlighting of elements with automation identifiers on a particular page of the web application. This shows the fully qualified automation identifiers for such elements on-demand for easier consumption while writing integration tests.

In some embodiments, the automation identifiers are attached in response to one or more specific triggers. For example, triggers may be defined such that the automation identifiers only attach when the web application is being run on test servers or during a testing phase, so as not to pollute the code that runs in production. Other tools and utilities may also be added later on, as the tagging is handled at only one place in the code in some embodiments.

Illustrative embodiments provide a number of advantages relative to conventional techniques. Such advantages include providing a configuration-based solution for generating automation identifiers that produce consistent fully qualified name building, thereby minimizing or reducing the chances of clashing with other identifiers. Conventional techniques that are based on manually defining automation identifiers can quickly become chaotic as, even with guidelines in place, the guidelines may not be strictly followed and there are multiple ways to fully qualify the manually-defined automation identifiers. Some manual approaches do not even fully qualify the automation identifiers, which is even worse. Regardless, such manual approaches lead to automation identifiers that are inconsistent or wrong (e.g., due to copying and pasting of code without proper updates, etc.). In addition, hardcoding automation identifiers can only work for non-shared components (e.g., components defined on a project not coming from an external library of shared components). It is difficult to manually maintain and update hardcoded automation identifiers. Further, developers may forget to fully qualify the hardcoded automation identifiers. This can result in identifier clashes in the UI which lead to failed integration tests that are very difficult to debug.

The configuration-based solution for generating automation identifiers described herein enables shared components to inherit the prefix of their container, and thus removes the need for forwarding prefixes. Forwarding identifier prefixes down the hierarchy of components is cumbersome as it requires the definition of dedicated inputs on all of the components in order to forward them down the component hierarchy. If not done properly, the automation identifiers do not get fully qualified. This can result in identifier clashes in the UI which lead to failed integration tests that are very difficult to debug.

The configuration-based solution for generating automation identifiers is also easy to maintain, as the attaching of automation identifiers is done at a single location in the code in some embodiments and therefore there is less chance of typographical errors and the automation identifiers are easy to change. Further, it is easy to configure behavior and options.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for integration testing of web applications utilizing dynamically generated automation identifiers will now be described in greater detail with reference to FIGS. 6 and 7. Although described in the context of system 100, these platforms may also be used to implement at least portions of other information processing systems in other embodiments.

Figure 6:
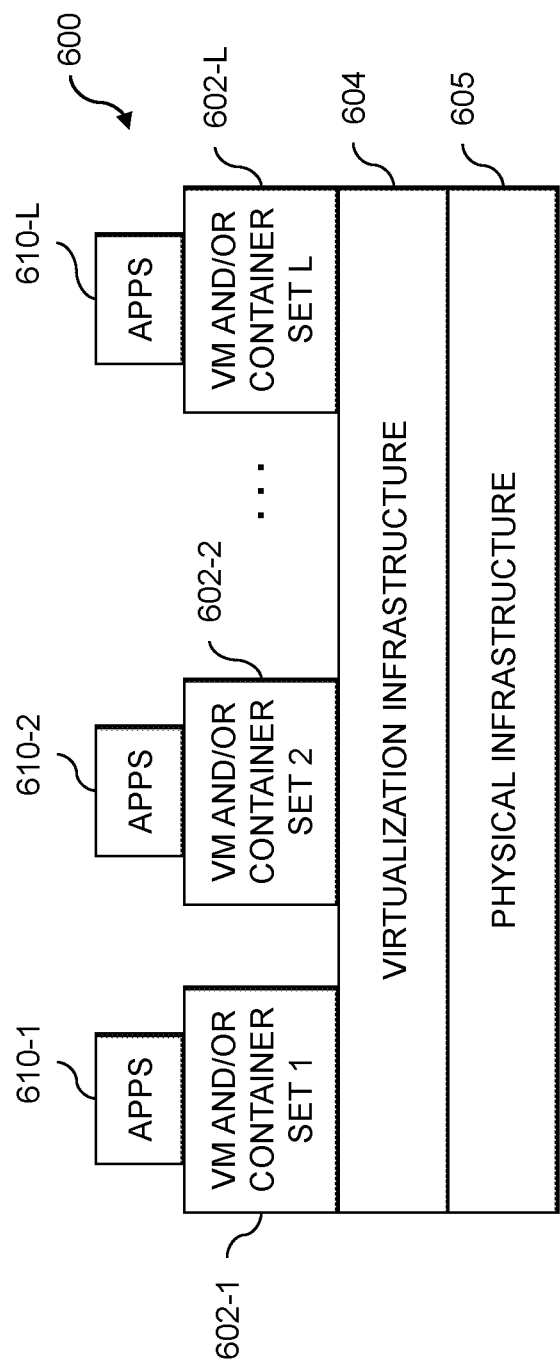
FIGS. 6 and 7 show examples of processing platforms that may be utilized to implement at least a portion of an information processing system in illustrative embodiments.
Figure 7:
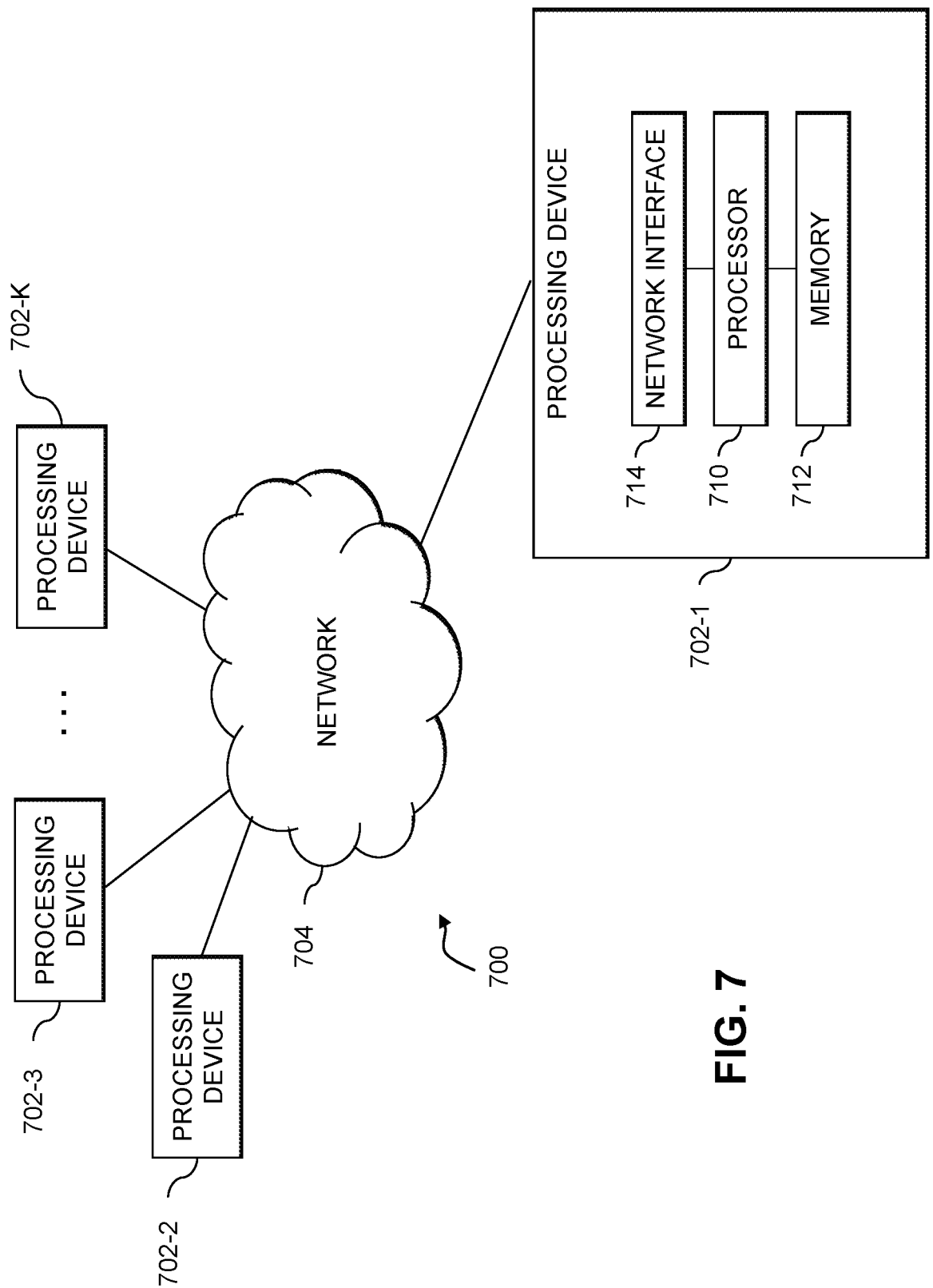

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for integration testing of web applications utilizing dynamically generated automation identifiers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web application frameworks, web application components, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        selecting at least a subset of a plurality of web components of a web application, the plurality of web components of the web application being arranged in a web component hierarchy, each of the plurality of web components comprising one or more web elements of the web application;
        assigning a tag to each web component in the subset of the plurality of web components, the tags comprising parameters identifying respective ones of the web components in the subset of the plurality of web components;
        dynamically generating an automation identifier for a given instance of at least one of the one or more web elements of the web application, the generated automation identifier being based at least in part on the parameters of the tags assigned to web components in the subset of the plurality of web components that are in a path from a root of the web component hierarchy to the at least one web element; and
        performing integration testing of the web application utilizing the dynamically generated automation identifier for the given instance of the at least one web element.

2. The apparatus of claim 1 wherein selecting the subset of the plurality of web components of the web application comprises selecting ones of the plurality of web components that identify different sections of a given page of the web application that is to be integration tested.

3. The apparatus of claim 1 wherein a given one of the tags, assigned to a given one of the web components in the subset, comprises an annotation code construct.

4. The apparatus of claim 3 wherein the given component of the web application utilizes a script programming language, and wherein the annotation code construct comprises a decorator.

5. The apparatus of claim 1 wherein a given one of the web components in the subset is associated with a given section of a given page of the web application, and wherein a given tag assigned to the given web component comprises a configuration flag configured to be set to a first value to enable generation of automation identifiers for the given section of the given page of the web application and to be set to a second value to disable generation of automation identifiers for the given section of the given page of the web application.

6. The apparatus of claim 1 wherein the at least one processing device is further configured to perform the step of applying at least one directive code construct to the at least one web element, the at least one directive code construct being configured to bind a lifecycle of the given instance of the at least one web element to an automation identifier attribute comprising the dynamically generated automation identifier.

7. The apparatus of claim 6 wherein the at least one directive is configured to attach the automation identifier attribute to the at least one web element responsive to mounting the given instance of the at least one web element in a document object model of the web application.

8. The apparatus of claim 6 wherein the at least one directive is configured to attach the automation identifier attribute to the at least one web element responsive to (i) detection of one or more triggers and (ii) mounting the given instance of the at least one web element in a document object model of the web application.

9. The apparatus of claim 8 wherein the one or more triggers comprise determining that the web application is running on a web application server dedicated for integration testing.

10. The apparatus of claim 8 wherein the one or more triggers comprise determining that the web application is running in a test phase.

11. The apparatus of claim 1 wherein the dynamically generated automation identifier comprises a fully qualified name of the given instance of the at least one web element.

12. The apparatus of claim 11 wherein the fully qualified name of the given instance of the at least one web element comprises a concatenation of the parameters of the tags assigned to web components in the subset of the plurality of web components that are in the path from the root of the web component hierarchy to the at least one web element.

13. The apparatus of claim 11 wherein performing the integration testing of the web application comprises utilizing a user interface element to toggle highlighting of web elements of a given page of the web application under test that comprise dynamically generated automation identifiers.

14. The apparatus of claim 1 wherein the at least one processing device is further configure to perform the step of updating the dynamically generated automation identifier of the given instance of the at least one web element responsive to the at least one web element changing a location within a given page of the web application.

15. A computer program product comprising a non-transitory processor-readable storage medium having stored therein program code of one or more software programs, wherein the program code when executed by at least one processing device causes the at least one processing device to perform steps of:

selecting at least a subset of a plurality of web components of a web application, the plurality of web components of the web application being arranged in a web component hierarchy, each of the plurality of web components comprising one or more web elements of the web application;

assigning a tag to each web component in the subset of the plurality of web components, the tags comprising parameters identifying respective ones of the web components in the subset of the plurality of web components;

dynamically generating an automation identifier for a given instance of at least one of the one or more web elements of the web application, the generated automation identifier being based at least in part on the parameters of the tags assigned to web components in the subset of the plurality of web components that are in a path from a root of the web component hierarchy to the at least one web element; and performing integration testing of the web application utilizing the dynamically generated automation identifier for the given instance of the at least one web element.

16. The computer program product of claim 15 wherein the program code when executed by the at least one processing device further causes the at least one processing device to perform the step of applying at least one directive code construct to the at least one web element, the at least one directive code construct being configured to bind a lifecycle of the given instance of the at least one web element to an automation identifier attribute comprising the dynamically generated automation identifier, wherein the at least one directive is configured to attach the automation identifier attribute to the at least one web element responsive to mounting the given instance of the at least one web element in a document object model of the web application.

17. The computer program product of claim 15 wherein the dynamically generated automation identifier comprises a fully qualified name of the given instance of the at least one web element, the fully qualified name of the given instance of the at least one web element comprising a concatenation of the parameters of the tags assigned to web components in the subset of the plurality of web components that are in the path from the root of the web component hierarchy to the at least one web element.

18. A method comprising steps of:

selecting at least a subset of a plurality of web components of a web application, the plurality of web components of the web application being arranged in a web component hierarchy, each of the plurality of web components comprising one or more web elements of the web application;

assigning a tag to each web component in the subset of the plurality of web components, the tags comprising parameters identifying respective ones of the web components in the subset of the plurality of web components;

dynamically generating an automation identifier for a given instance of at least one of the one or more web elements of the web application, the generated automation identifier being based at least in part on the parameters of the tags assigned to web components in the subset of the plurality of web components that are in a path from a root of the web component hierarchy to the at least one web element; and performing integration testing of the web application utilizing the dynamically generated automation identifier for the given instance of the at least one web element;

wherein the method is performed by at least one processing device comprising a processor coupled to a memory.

19. The method of claim 18 further comprising applying at least one directive code construct to the at least one web element, the at least one directive code construct being configured to bind a lifecycle of the given instance of the at least one web element to an automation identifier attribute comprising the dynamically generated automation identifier, wherein the at least one directive is configured to attach the automation identifier attribute to the at least one web element responsive to mounting the given instance of the at least one web element in a document object model of the web application.

20. The method of claim 18 wherein the dynamically generated automation identifier comprises a fully qualified name of the given instance of the at least one web element, the fully qualified name of the given instance of the at least one web element comprising a concatenation of the parameters of the tags assigned to web components in the subset of the plurality of web components that are in the path from the root of the web component hierarchy to the at least one web element.

\* \* \* \* \*